United States Patent [19]

Krogsrud

[11] Patent Number: 4,724,772
[45] Date of Patent: Feb. 16, 1988

[54] DEVICE FOR TOWING LOADS

[76] Inventor: Harald Krogsrud, Baerumsveien 447, 1346 Gjettum, Norway

[21] Appl. No.: 860,196
[22] PCT Filed: Sep. 3, 1984
[86] PCT No.: PCT/NO84/00032
§ 371 Date: Apr. 28, 1986
§ 102(e) Date: Apr. 28, 1986
[87] PCT Pub. No.: WO86/01475
PCT Pub. Date: Mar. 13, 1986

[51] Int. Cl.[4] .................. B65G 17/26; B65G 17/38
[52] U.S. Cl. .................. 104/239; 104/140; 104/173.2; 198/716; 198/733
[58] Field of Search ........... 104/139, 140, 165, 173.1, 104/173.2, 238, 239, 123; 198/716, 733, 833

[56] References Cited

U.S. PATENT DOCUMENTS

| | | | |
|---|---|---|---|
| 2,975,727 | 3/1961 | Kokoras | 104/91 |
| 3,411,456 | 11/1968 | Stevens | 104/91 |
| 3,854,410 | 12/1974 | Crowder | 104/140 X |
| 3,910,403 | 10/1975 | Morsbach et al. | 198/685 |
| 3,968,861 | 7/1976 | Kernen | 104/140 X |
| 4,354,575 | 10/1982 | Andersson | 198/795 X |
| 4,399,904 | 8/1983 | Canziani | 104/140 X |

FOREIGN PATENT DOCUMENTS

| | | |
|---|---|---|
| 2256320 | 5/1973 | Fed. Rep. of Germany ...... 104/123 |
| 2430577 | 1/1975 | Fed. Rep. of Germany . |
| 2632684 | 7/1982 | Fed. Rep. of Germany . |
| 2135061 | 12/1972 | France . |
| 8004305-2 | 6/1983 | Sweden . |
| 613969 | 7/1978 | U.S.S.R. ...... 104/173.1 |

Primary Examiner—Robert B. Reeves
Assistant Examiner—Scott H. Werny
Attorney, Agent, or Firm—Roland T. Bryan

[57] ABSTRACT

A ski comprising a guide pipe (2) guiding a string of elements that transmit a towing force to any conventional towing device attached to the string at suitable intervals. Instead of being a tension element like a wire, a rope or the like, which is conventional in known ski tows, the string consists of separate pressure elements (7), each having at either end an end face contacting the opposed end face of an adjacent element, whereby the towing force is transmitted by pushing the string, which is accordingly subjected to a compression force. The size and shape of the end faces (11) are such that at any possible angular position of two adjacent pressure elements (7a, 7b) due to tolerances between the guide pipe (2) and the elements (7) and/or to curves in the load towing section (4) of the guide pipe (2), the point of contact (15) between the contacting end faces (11) lies to the side of a notional straight line (14) extending through the centers (12a, 12b) of the two adjacent elements (7a, 7b) opposite from the point of intersection (16) between the longitudinal notional axes (13a, 13b) of the two adjacent elements (7a, 7b). Thereby, the string of pressure elements (7) when subjected to a compressive force due to advancing the string by pushing, will tend to form a stable, straight column, which column is still free to fold when required by curves in the guide pipe (2).

10 Claims, 6 Drawing Figures

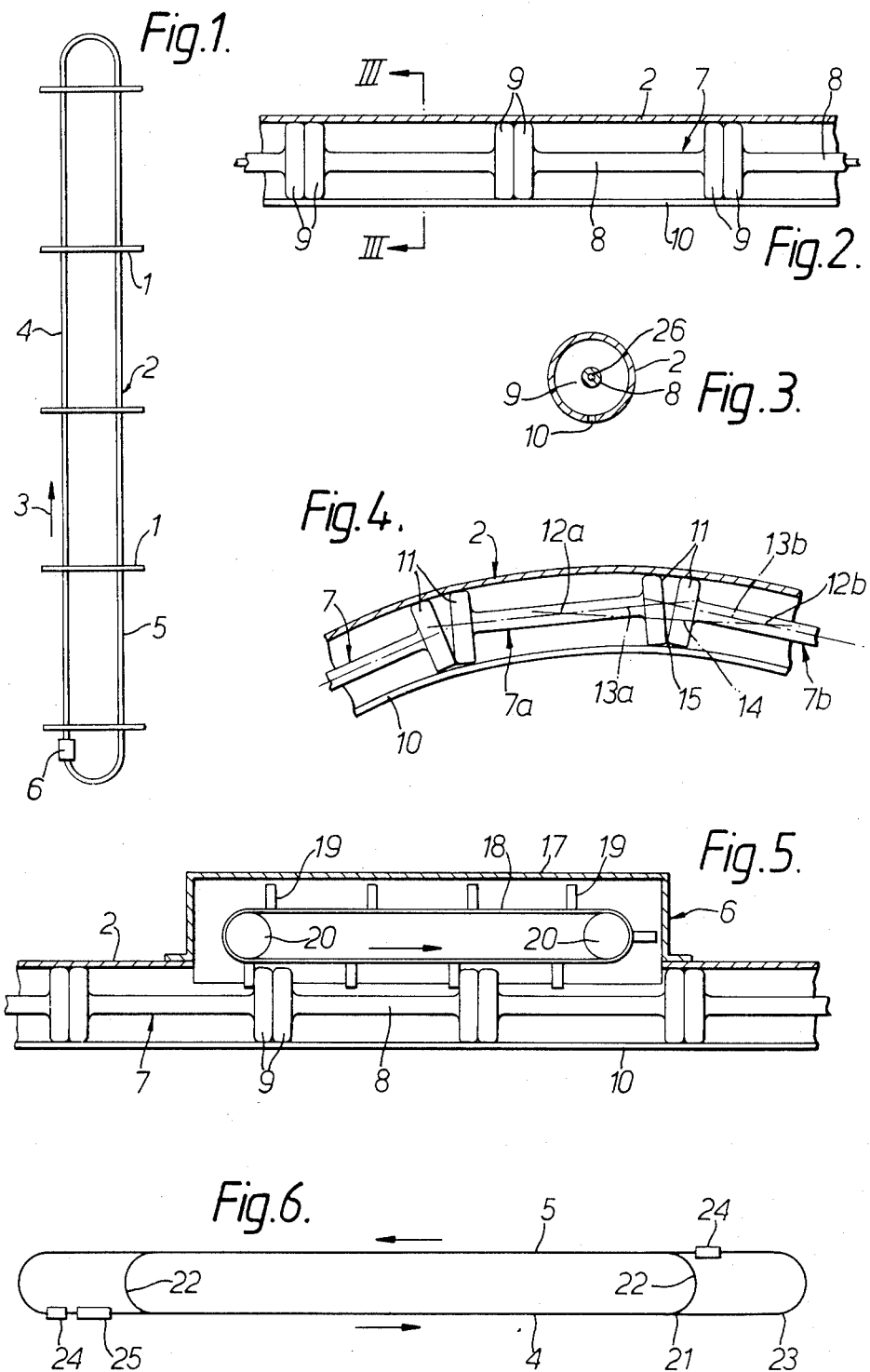

DEVICE FOR TOWING LOADS

The invention relates to a device for towing loads and especially to a ski tow, that is a device for towing skiers gliding on their own skis, preferably uphill. However, the device can also be used in transporting people in chair lifts or in trolleys running on rails. The device is intended for installation between a predetermined starting point and a predetermined end point spaced by a substantial distance of at least several hundred meters and sometimes more than one thousand meters.

Known devices of this type for transporting people by towing in open country are based upon the use of a tension element in the form of a wire, a rope or the like, which transmits energy to the load towed. To prevent accidents occuring from a break of the wire a close control and extensive maintenance of the device are required.

From German printed accepted patent specification No. 24 34 817 there is also known a lift which is towed along two parallel guide pipes containing a sequence of pressure elements each having at either end an end face contacting the opposed end face of an adjacent element, thus allowing the elements to be advanced as a string along the guide pipe, said device also comprising a drive means engaging at least one pressure element of the string at any time and pushing the string along the guide pipe. Thereby, the difficulties associated with the inherent risk of a break of a wire, a chain, a rope or a similar tension element are avoided.

However, the lift according to the German specification can be used only for relatively short transport stretches, since the pressure elements will engage the inner walls of the guide pipe with considerable frictional force, whereby the propulsion energy imparted to the string of pressure elements by the drive means will be consumed as frictional energy when the device is loaded, leaving little or no energy for moving the payload. For this reason the use of a device according to the German specification in the towing of loads over long stretches such as required by ski tows is not possible.

The object of the invention is to improve the principle of using a sequence of pressure elements instead of a tension element by reducing the resistance of the string of elements to movement along a guide means to an extent allowing the use of this principle for rather long transport stretches, such as required in ski tows or ski lifts.

The device according to the invention comprises a guide means extending in a closed path and including a load towing section, a sequence of pressure elements each having at either end an end face contacting the opposed end face of an adjacent element, thus allowing the elements to be advanced as a string along the guide means, towing means engaging the string and towing the loads, and drive means engaging at least one pressure element of the string at any time and pushing the string along the guide means. The invention is characterized in that the size and shape of the end faces are such that at any possible angular position of two adjacent elements due to tolerances between the guide means and the elements and/or to curves in the load towing section of the closed path the point of contact between the contacting end faces lies to the side of a notional straight line extending through the centers of said two adjacent elements opposite from the point of intersection between the longitudinal notional axes of said two adjacent elements, whereby the string of pressure elements when subjected to a pushing force from the drive means will tend to form a stable, straight column, still being free to fold when required by curves in the guide means.

Preferably, the end faces are substantially plane, whereby said point of contact will be shifted to the edges of the contacting end faces as soon as the respective elements are not in alignment. These edges may be positioned on the radially outermost contour of the element, whereby a maximum stabilization of the column is obtained for a given radial dimension of the elements.

However, the end faces do not need to be exactly plane, but can be slightly curved provided the radius of curvature is larger than half the length of the element.

The preferred configuration of the guide means is the same as according to the German specification No. 24 34 817, that is an endless pipe surrounding the pressure elements and having a longitudinal continuous slot for the towing means. The towing means may be fastened to one of the pressure elements, thereby following the continuous string of pressure elements along the closed path provided by the guide means. However, the towing means may alternatively be releasably attached to the string, a solution which provides considerable comfort to the skier, both when starting and terminating the towing operation.

Due to the fact that the string of pressure elements when subjected to a longitudinal compressive force will tend to form a stable, straight column instead of a zigzag line, the friction between the string of pressure elements and the guide pipe will be dramatically reduced. Accordingly, the pressure energy imparted to the string of pressure elements by the drive means will in all substantial respects be transferred to the towing means. This is true even if there are no rollers or the like guiding the pressure elements on the guide means. The string of pressure elements may simply slide on the guide means, and the pressure elements may consequently have a very simple design, each pressure element preferably consisting of an axial stem and two flange-like end parts. It will be understood, however, that there is nothing preventing the pressure elements from carrying rollers if desired. The material of the pressure elements may be a metal such as steel or aluminium or a plastic material.

Further objects, features and advantages of the invention will be evident to those skilled in the art upon reading of the following detailed description of a preferred embodiment of the device according to the invention, reference being had to the drawings.

FIG. 1 is a diagrammatic plan view of a short ski tow according to the invention.

FIG. 2 is a longitudinal section through a guide means in the form of a pipe of circular cross-section, said pipe containing a string of pressure elements.

FIG. 3 is a cross-sectional view along the line III—III in FIG. 2.

FIG. 4 is a longitudinal section corresponding to FIG. 2 showing the relationship between the individual pressure elements of the string when the guide pipe follows a curve.

FIG. 5 is a highly diagrammatic view illustrating the principle of a possible drive means.

FIG. 6 is a highly diagrammatic plan view of a closed path for a ski lift or tow including branch lines for entering and leaving the lift.

The plan view in FIG. 1 illustrates masts 1, in which a guide pipe 2 extending in a closed path is suspended. An arrow 3 indicates the towing direction of the device implying that the left-hand stretch 4 of the guide pipe 2 defines a load towing section, the other stretch defining a return section 5. A drive section 6 is indicated in the initial portion of the load towing section 4 of the closed path.

FIGS. 2 and 3 illustrate on a greater scale the guide pipe 2 containing a string of pressure elements 7, each consisting of an axial stem 8 and two flange-like end parts 9. In order to allow towing means (not shown) to be connected to the string of pressure elements 7 in the guide pipe 2 the latter is provided with a continuous slot 10. Each element 7 has an axial center bore 26 allowing the elements to be loosely threaded on a wire, a rope or a similar element (not shown).

FIG. 4 illustrates the behavior of the string of pressure elements 7 when adjacent pressure elements take an angular position relative to each other due to a curvature in the load towing section 4 of the guide pipe 2. Also if two adjacent elements should take up a slightly angular position with respect to each other due to tolerances between the guide pipe 2 and the element 7, the behavior of the string of elements 7 will be the same as illustrated in FIG. 4 and discussed below. For said discussion reference will be made to the middle element 7a and the right-hand element 7b in FIG. 4. The geometrical centers of the elements 7a and 7b, are designated as 12a and 12b, respectively. Also the longitudinal notional axes 13a and 13b of the respective elements have been indicated. Finally, FIG. 4 shows a notional straight line 14 extending through the centers 12a and 12b. The end faces of each element 7 are designated by the reference 11. It will be seen from FIG. 4 that the point of contact 15 between the contacting end faces 11 of the elements 7a and 7b, respectively, lies on the side of the notional straight line 14 opposite from the point of intersection of the axes 13a and 13b. For this reason the string of pressure elements 7 will tend to straighten out and form a stable, straight column when subjected to a longitudinal compression force such as a pushing force from the drive means to overcome a towing load. In fact, this tendency will be stronger the larger the compression force, and if the guide pipe 2 is straight, the string of pressure elements will in fact form a stable, straight column. Such a straight, stiff column will not convey substantial frictional forces to the walls of the guide pipe 2. Still said column is free to fold as indicated in FIG. 4 when required by a curvature in the guide pipe 2. If the curvature is slighter than what is shown in FIG. 4, the column may well stay straight for the length of several elements 7, the column folding as shown in FIG. 4 at intervals according to the curvature.

Although the string of pressure elements 7 can be pushed along the guide pipe 2 in various ways, FIG. 5 diagrammaticly illustrates one possibility of obtaining the desired pushing force. At a suitable point of the guide pipe 2 part of the upper wall thereof has been removed and covered by a housing 17 containing a drive chain 18 having carrier dogs 19 and passing over rollers 20, one of which can be driven by a motor (not shown). When the chain is driven, the carrier dogs 19 will engage the rear side of the front end part 9 of at least one pressure element 7 at any time.

Since the string of pressure elements 7 are advanced by being pushed against the towing load force transmitted from the skiers through the towing means (not shown) it is hard to imagine that the load can be damaged by any type of failure in the string as contrasted with what may happen if a tension element such as a wire is used for transmitting a towing force to the towing means.

The masts 1 may be foundation-free rocker frame masts stayed by two parallel wires (not shown) each following a catenary between successive masts and carrying the load towing section 4 and the return section 5, respectively, of the guide pipe 2. These two sections 4 and 5 are suspended in the respective wires by vertical rods or wires (not shown) which are substantially shorter at the points midway between the masts than directly below the masts, thus providing a much straighter path of the guide pipe 2 in side view than the catenary followed by the wires. This structure can be likened with the way in which an electric pantograph contact wire or a suspension bridge is suspended. The masts 1 are vertical or preferably leaning somewhat towards the uphill up which the ski tow is mounted. Thereby, the greater part of the towing load force exerted on the ski tow by the skiers and tending to tilt the rocker masts in a downhill direction, will be taken up by the masts and transmitted to the ground. The structure connecting the masts, i.e. the wires and the guide pipe sections 4 and 5 suspended therein will resiliently transmit some of the load to the next masts uphill, whereby also these masts will transmit parts of load to the ground.

These characteristics of the ski tow according to the invention are highly advantageous. They are associated not only with the design of the supporting structure including the masts, but also with the fact that the towing force is provided by pressure elements 7 instead of a tension element such as a wire. A tensioned wire will tend to straighten out, thereby lifting any mast positioned below a straight line between the preceding and the following masts, requiring the masts to be anchored in foundations in the ground.

The ski tow according to the invention needs no anchoring of the masts in the ground. Only both ends of the wires staying the masts should be anchored.

Further, in a ski tow having a force transmitting string of pressure elements the reaction forces from the load towing force will be dissipated to the ground through one or more of the nearest masts, whereas in a ski tow using a tension wire they will be accumulated and transmitted through the return run of the wire all the way down to the drive station, which is normally located at the bottom of the hill for practical reasons.

The device according to the invention has a very simple design. Since it can follow the ground and be laterally deflected to both sides as required, the height above the ground may be kept at a minimum.

The towing means may be attached to the string of pressure elements 7 by means of plates (not shown) extending through the slot 10, each element being permanently attached to an element 7 of the string. E.g. every 15th or 20th element may have a plate attached thereto. However, a greater flexibility is obtained if the towing means are not permanently attached to the elements 7, but are only releasably coupled thereto. Thus, the towing means may be attached to a trolley or carriage (not shown) which may run inside the guide pipe 2 between the two end parts 9 of an element 7. In this case the towing means including the trolleys may be disconnected from a string of pressure elements 7 at the end of the load towing section 4 or the return section 5 and be connected to the string only when needed, e.g. when a skier wants to be towed to the end of the towing section 4.

In FIG. 6 some principles of a ski tow employing such releasable towing means are shown. Masts 1 as shown in FIG. 1 are not illustrated for sake of simplicity. FIG. 6 illustrates an inner closed path or loop consisting of a towing section 4, a return section 5 and two bends 22 connecting said sections. The string of pressure elements 7 is circulated in said loop by means of one or more driving stations (not shown). At or ahead of the point 21 where the pressure elements 7 leave the load towing section 4 and enter the bend 22 leading to the return section 5 of the guide pipe, the trolleys carrying towing means are released from the string of elements 7 and enter a branch line 23. This arrangements allows a much easier and safer dismounting of the ski tow by a towed skier, since the speed of the trolley may be zero at one point of the branch line 23. However, subsequently arriving trolleys will push the front trolley in the branch line past a summit from which the trolleys will roll towards a line regulator 24 letting only one trolley pass for each 15 to 20 pressure elements 7 arriving from the bend 22. A similar arrangement can be provided at the start of the load towing section 4, whereby a skier may grasp a towing means when stationary, whereupon the trolley may be accelerated by an acceleration means 25 to the same speed as the string of elements 7 and be coupled therewith by being guided into the space between the two end parts 9 of a pressure element 7.

Such acceleration means will provide a high degree of comfort and make it possible to advance the elements 7 along the load towing section at high speed.

As indicated above more than one driving station may be used. The driving stations may be standard units provided at intervals according to the requirements. If placed behind sharp curves like the bend 22 they will contribute to reducing the frictional forces.

The device lends itself to self service by skiers. The parts of the device are very simple, and consequently the construction costs as well as the operating and maintenance costs are heavily reduced compared with existing ski tows.

What is claimed is:

1. A device for towing loads, comprising a guide path means extending as a closed path with a load towing section, a sequence of compression pressure elements filling said closed path and each having at either end an end face contacting the opposed end face of an adjacent element, thus providing the elements as a string within the closed path of the guide path means, means in said path allowing access to the elements for towing loads and drive means engaging at least one compression pressure element of the string at any time whereby energy is transmitted from said drive means to said one element by compression and to each of said elements to push the string around within said guide path means, characterized in that the size and shape of the end faces are such that at any possible angular position of two adjacent elements due to tolerances between the guide path means and the elements and/or to curves in the load towing section of the guide means, the point of contact between the contacting end faces lies to the side of a notional straight line extending through the centers of said two adjacent elements opposite from the point of intersection between the longitudinal notional axes of said two adjacent elements, so that by the aforesaid shaped pressure element the string of pressure elements, when subjected to a pushing force from the drive means, will tend to form a stable, straight recirculating column within said path that is free to fold when required by curves in the guide means.

2. A device according to claim 1 characterized in that the end faces are substantially plane, whereby said point of contact will be shifted to the edges of the contacting end faces as soon as the respective elements are not in alignment.

3. A device according to claim 2 characterized in that the edge of each end face is positioned on the radially outermost contour of the element.

4. A device according to claim 2 characterized in that the edge of each end face is rounded.

5. A device according to any preceding claim, characterized in that the loads to be towed are skiers gliding on their own skis, and that the load towing section of the guide path means is several hundred meters long.

6. A device according to claim 5 characterized in that the drive means is provided in the initial portion of the load towing section of the guide path means.

7. A device according to any one of claims 1–4, characterized in that the guide path means comprises an endless pipe surrounding the pressure elements and having a longitudinal continuous slot for a towing means.

8. A device according to any one of claims 1–4, characterized in that each compression pressure element consists of an axial stem and two flange-like end parts.

9. A device according to claim 8, characterized in that the drive means comprises carrier dogs for engaging the end part of a compression pressure element to impart compression energy to said part.

10. A device according to any one of claims 1–4, characterized in that each compression pressure element is threaded on a flexible element extending through an axial center bore in each element, thereby interconnecting the string of elements.

* * * * *